United States Patent
Shanks et al.

(10) Patent No.: US 10,374,828 B2
(45) Date of Patent: Aug. 6, 2019

(54) SERVICE-SPECIFIC, PERFORMANCE-BASED ROUTING

(71) Applicant: Cisco Technology, Inc., San Jose, CA (US)

(72) Inventors: Robert Tristan Shanks, San Mateo, CA (US); Jignesh Devji Patel, Fremont, CA (US); Patrick Douglas Verkaik, San Francisco, CA (US); Selahattin Daghan Altas, San Francisco, CA (US); Joseph Morgan Aronow, San Francisco, CA (US); Justin Delegard, San Francisco, CA (US); Dylan Jason Koenig, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 86 days.

(21) Appl. No.: 14/974,369

(22) Filed: Dec. 18, 2015

(65) Prior Publication Data

US 2017/0180155 A1    Jun. 22, 2017

(51) Int. Cl.
*H04L 12/46* (2006.01)
*H04L 12/725* (2013.01)

(52) U.S. Cl.
CPC ...... *H04L 12/4633* (2013.01); *H04L 45/3065* (2013.01)

(58) Field of Classification Search
CPC .............................. H04L 67/14; H04L 69/16
USPC .................................................. 370/252–401
See application file for complete search history.

(56) References Cited

U.S. PATENT DOCUMENTS

| | | | |
|---|---|---|---|
| 7,117,530 B1 | 10/2006 | Lin | |
| 7,120,682 B1 | 10/2006 | Salama | |
| 7,251,824 B2 | 7/2007 | Edwards et al. | |
| 8,855,012 B1* | 10/2014 | Suri | H04L 12/2856 370/254 |
| 2003/0140142 A1 | 7/2003 | Marples et al. | |
| 2010/0226304 A1* | 9/2010 | Shoji | H04B 1/40 370/315 |
| 2014/0198798 A1* | 7/2014 | Akiyoshi | H04W 76/10 370/392 |
| 2015/0092603 A1 | 4/2015 | Aguayo | |
| 2015/0381387 A1* | 12/2015 | Sharan | H04L 63/0272 709/218 |

* cited by examiner

*Primary Examiner* — Iqbal Zaidi
(74) *Attorney, Agent, or Firm* — Polsinelli PC

(57) ABSTRACT

Various implementations disclosed herein include systems, methods and apparatuses that involve a first device selecting a data tunnel for sending packets of a determined network traffic type to another device. For example, in some implementations, a method includes a first device receiving a first group of packets for forwarding to a second device. The method includes the first device retrieving packet-forwarding rules for forwarding the first group of packets, and selecting a first private network data tunnel from a plurality of private network data tunnels between the first device and the second device, for forwarding a first packet of the first group of packets, based on satisfaction of the retrieved packet-forwarding rules. A respective private network data tunnel is associated with a respective uplink of a plurality of uplinks of the first network device. The first private network data tunnel is associated with a first uplink of the first device.

19 Claims, 11 Drawing Sheets

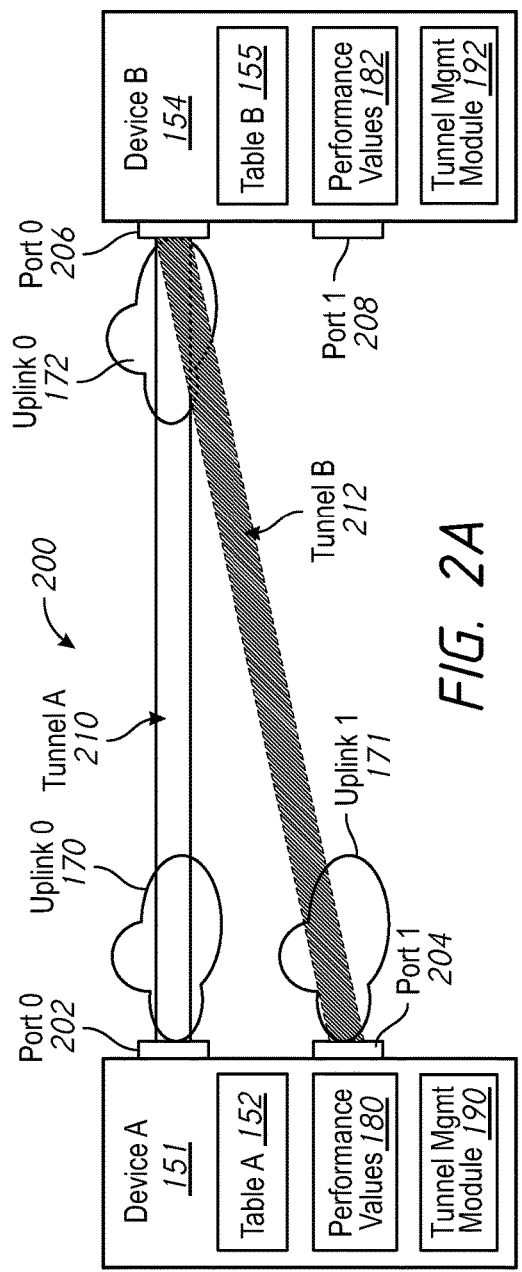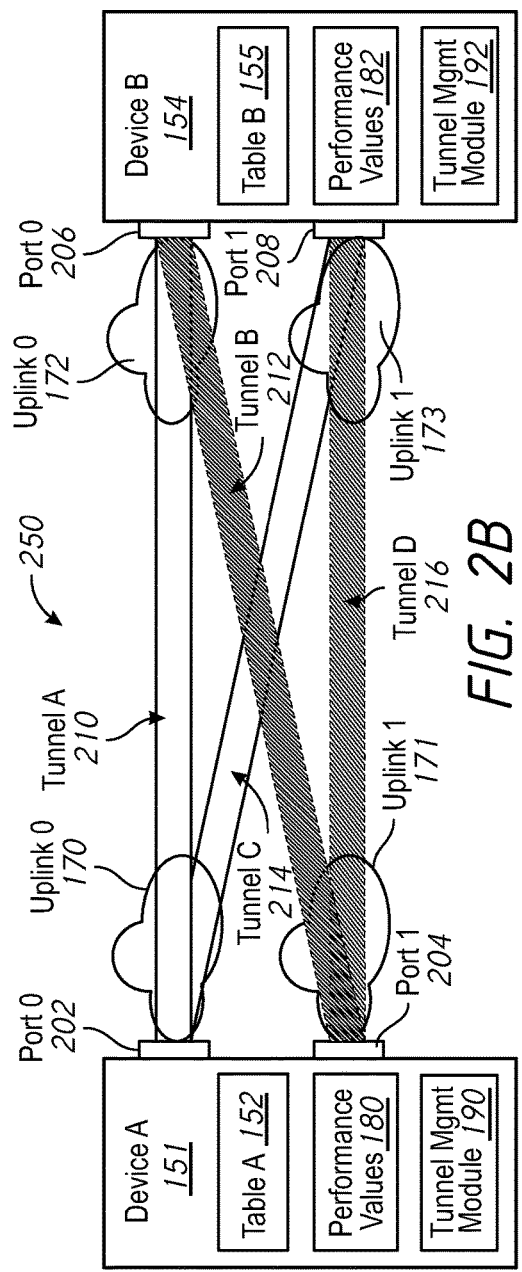

Contact point registry

| Device | Uplink Identifier | Uplink Type | Device Private Contact Point Information | | Device Public Contact Point Information | | Peer Devices | Hub/Spoke |
|---|---|---|---|---|---|---|---|---|
| | | | IP Address | Port | IP Address | Port | | |
| A | 0 | MPLS | 10.0.10.0 | 50234 | 10.0.10.0 | 50234 | B,C,D,E | Hub |
| A | 1 | MPLS | 10.1.1.30 | 59876 | 10.1.1.30 | 59876 | B,C,D,E | Hub |
| B | 0 | Internet | 172.16.0.2 | 51497 | 24.6.216.39 | 35867 | A | Spoke |
| B | 1 | Internet | 172.10.10.20 | 52000 | 24.10.20.30 | 35800 | A | Spoke |
| C | 0 | MPLS | 192.168.1.1 | 60583 | 70.108.34.0 | 41234 | A | Spoke |
| C | 1 | Internet | 192.1.50.50 | 60500 | 70.1.20.20 | 43987 | A | Spoke |
| D | 0 | MPLS | 10.255.0.255 | 61761 | 96.42.255.26 | 56287 | A | Spoke |
| D | 1 | Internet | | | | | A | Spoke |
| E | 0 | MPLS | 192.1.3.27 | 50510 | 82.15.40.50 | 41985 | A | Spoke |
| E | 1 | Internet | 10.212.30.200 | 60164 | 97.58.255.0 | 55270 | A | Spoke |

FIG. 4A

Local Peer Contact point Table

| Peer Devices ID | Uplink Identifier | Uplink Type | Peer Device Private Contact Point | | Peer Device Public Contact Point | | Status |
|---|---|---|---|---|---|---|---|
| | | | IP Address | Port | IP Address | Port | |
| B | 0 | Internet | 172.16.0.2 | 51497 | 24.6.216.39 | 35867 | Online |
| B | 1 | Internet | 172.10.10.20 | 52000 | 24.10.20.30 | 35800 | Online |
| C | 0 | MPLS | 192.168.1.1 | 60583 | 70.108.34.0 | 41234 | Offline |
| C | 1 | Internet | 192.1.50.50 | 60500 | 70.1.20.20 | 43987 | Online |
| D | 0 | MPLS | 10.255.0.255 | 61761 | 96.42.255.26 | 56287 | Offline |
| D | 1 | Internet | | | | | Online |
| E | 0 | MPLS | 192.10.3.27 | 50510 | 82.15.40.50 | 41985 | Online |
| E | 1 | Internet | 10.212.30.200 | 60164 | 97.58.255.0 | 55270 | Online |

FIG. 4B

SERVICE-SPECIFIC, PERFORMANCE-BASED ROUTING

TECHNICAL FIELD

The present disclosure relates to communication networks, and in particular, to the selection of private network data tunnels between networking devices.

BACKGROUND

As a business organization grows and spreads out to geographically separated branch locations, the associated information technology (IT) network infrastructure often also changes. One aspect of changing IT network infrastructure is the desire to establish and maintain a secure private network associated with the business organization that is distributed geographically. In many cases, a private network between branch locations is established over public networks. One example of this networking technique is site-to-site virtual private network (VPN) deployment. In order to set up and maintain these private networks, various networking devices such as routers, switches and security appliances are utilized.

In recent years, various technology trends such as the migration of computing resources to the cloud, and a rapid increase in mobile device data usage have contributed to an increase in private network traffic among networking devices. Networking devices have traditionally been limited to using one network connection to support private network data communication, even if a networking device has multiple external-facing ports that could support other network connections. Although this existing technique offers simplicity, the limitation of using a single network connection in order to establish and support private network data communication often results in a bandwidth constraint as private network demand for networking resources increases.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate some example features of the present disclosure and are therefore not to be considered limiting, for the description may admit to other effective features.

FIG. 2A is a block diagram illustrating data tunnels terminating at a multi-uplink network device in accordance with some implementations.

FIG. 2B is a block diagram illustrating data tunnels between multi-uplink network devices in accordance with some implementations.

FIG. 4A is a table representing an example of a contact point registry for multi-uplink network devices in accordance with some implementations.

FIG. 4B is an example of a local multi-uplink peer contact point table in accordance with some implementations.

Figure 1:
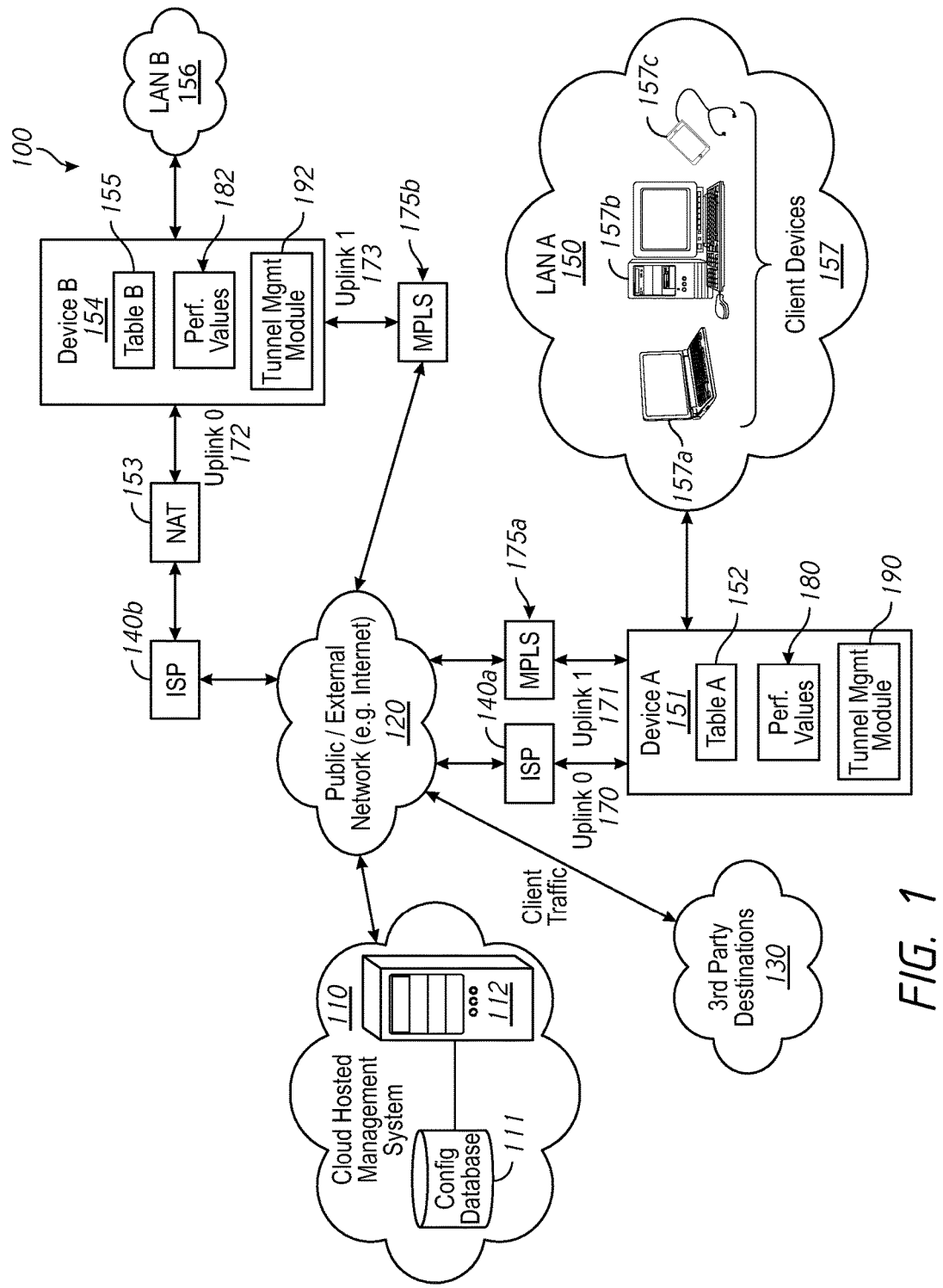
FIG. 1 is a block diagram of a networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previous private network implementations fail to provide systems or processes that support a selection of a private network data tunnel from a plurality of private network data tunnels based on satisfaction of service-type rules amongst networking devices. By contrast, and to that end, various implementations disclosed herein include systems, methods and apparatuses that involve a first multi-uplink network device selecting a data tunnel for sending packets of a determined network traffic type to another network device. For example, in some implementations, a method includes a first network device receiving a first group of packets for forwarding to a second network device. The method includes the first network device retrieving packet-forwarding rules for forwarding the first group of packets, and selecting a first private network data tunnel from a plurality of private network data tunnels between the first network device and the second network device, for forwarding a first packet of the first group of packets, based on satisfaction of the retrieved packet-forwarding rules. A respective private network data tunnel is associated with a respective uplink of a plurality of uplinks of the first network device. The first private network data tunnel is associated with a first uplink of the first device.

FIG. 1 is a block diagram of a networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, networking environment 100 includes a public/external network 120 (e.g., a portion of the Internet), one or more third-party destinations 130, a cloud hosted network management system 110, an optional network address translation device (NAT) 153, optional Internet service provider (ISP) nodes 140a and 140b, optional multiprotocol label switching (MPLS) nodes 175a and 175b, network device A 151, network device B 154, and local area networks LAN A 150 and LAN B 156. In some implementations, MPLS nodes 175a and 175b are ISP nodes similar to ISP nodes 140a and 140b. In some embodiments, MPLS node 175a is the same as ISP node 140a, and/or MPLS node 175b is the same as ISP node 140b (e.g., the same Internet service provider supplies each connection).

Moreover, while FIG. 1 includes two LANs (e.g., LAN A 150 and LAN B 156), those of ordinary skill in the art will appreciate that in some implementations, a private network is associated with an arbitrary number of geographically distributed and/or collocated local area networks.

In various implementations, LANs (e.g., LAN A 150 and/or LAN B 156) include additional infrastructure not shown in FIG. 1, such as a gateway node, and/or a network root node. In some implementations, LANs are associated with a number of compliant networking devices, and/or a number of non-compliant networking devices, where compliant devices are configured to communicate particular information with the cloud hosted network management system 110. For example, compliant devices are configured to share status information, configuration information and/or network traffic information with the cloud hosted network management system 110 and/or other compliant devices. In some implementations, a number of client devices 157 are operating within a respective LAN.

Example network devices, Device A 151 and Device B 154 are capable of establishing private network tunnels (e.g., VPN data tunnels) simultaneously using two or more uplinks. While FIG. 1 includes two network devices, those of ordinary skill in the art will appreciate that in some implementations, a private network is associated with an arbitrary number of geographically distributed and/or collocated network devices. In some implementations, Device A 151 includes local peer contact point table A 152, and Device B 154 includes local peer contact point table B 155. In some implementations, Device A 151 includes performance parameter values 180, and Device B 154 includes performance parameter values 182. In some implementations, Device A 151 includes tunnel management module 190, and Device B 154 includes tunnel management module 192. In some implementations, a tunnel management module includes one or more sub-modules for selecting a respective data tunnel between network devices, for the transfer of data packets. For example, tunnel management module 190 includes one or more of a network access module, packet-forwarding rule retrieval module, data tunnel selection module, packet traffic determination module, performance parameter management module, communication module, peer uplink identification module and load-balancing module. Those of ordinary skill in the art will appreciate from the present disclosure that one or more modules of the tunnel management module are implemented in software, hardware, firmware, or any combination thereof. In some implementations, the one or more modules of tunnel management module 190 and/or tunnel management module 192 correspond to one or more modules described below with respect to FIG. 9.

In some embodiments, at least one uplink for a respective network device uses an Internet network connection and at least one uplink for a respective network device uses a higher-quality connection. For example, Device A 151 uses Uplink 0 170 to connect to public/external network 120 using a low-cost and lower quality link provided by ISP 140a, and Uplink 1 171 to connect to a higher-quality MPLS link 175a. Unlike network devices utilizing a "hot standby" or backup uplink, Device A 151 uses at least two uplinks on an active basis during normal operation. The multi-uplink network devices shown in FIG. 1 each show two active uplinks, however those of ordinary skill in the art will appreciate from the present disclosure that in some embodiments, the multi-uplink devices disclosed herein utilize more than two simultaneously active uplinks for the establishment, maintenance and use of a private network. Furthermore, while the multi-uplink network devices shown in FIG. 1 show the use of Internet and MPLS uplinks, those of ordinary skill in the art will appreciate from the present disclosure that in some embodiments, the uplink connections include other technologies, including satellite services such as very small aperture terminal (VSAT) links.

In some embodiments, network devices with this multi-uplink capability selectively route network traffic over data tunnels established between network devices. For example, in some implementations, routing decisions are based on attempts to reduce bandwidth-related costs associated with the use of high-quality network connections, such as MPLS links, which can be supplemented with a lower-cost network connection, such as an Internet connection. In some embodiments, multi-uplink network devices selectively route network traffic over data tunnels, to isolate sensitive data and ensure that there is adequate bandwidth for high priority activities such as transferring payment information. For example, a multi-uplink networking device can route credit card transaction information through a tunnel using its MPLS uplink, and route web-surfing traffic through a tunnel using its Internet uplink.

The one or more third-party destinations 130 provide various third-party content and services, such as email, media content, online banking, social networking servers, etc. Other than providing sources and/or destinations for client data traffic, the details of the one or more third-party destinations 130 are not particularly pertinent to the scope of the present disclosure. As such, no further details pertaining to the one or more third-party destinations 130 are provided for the sake of brevity.

FIG. 1 further illustrates that Device A 151 connects LAN A 150 to the public network 120 through an optional ISP node 140a, and in some embodiments, includes features such as a firewall. In some implementations, a network device such as Device A 151 is provided as a single entity (e.g., a router, a virtual machine, etc.). In some implementations, a network device such as Device A 151 includes a distributed system including a suitable combination of software, data structures, virtual machines, computing devices, servers, switches and routers. Merely for the sake of brevity and convenience of explanation, network devices are described herein as single entities.

In some implementations, network devices, such as Device A 151 and/or Device B 154, include routers and/or provide routing functionality. In some implementations, a network device operates in connection with other networking appliances such as NAT devices (e.g., NAT 153), while in some implementations at least some of the functionality of one or more other appliances is built into the network devices. In some embodiments, network devices are capable of filtering network traffic to and from client devices 157, and optionally performing this filtering on the basis of Layer 7 (of the OSI model) packet information. In some implementations, network devices such as Device A 151 and/or Device B 154, are used to establish private networks (e.g., virtual private networks or VPNs) between themselves. In some of these implementations, some or all network traffic from client devices 157 can be routed through a network device over a private network. For example, Device A 151 is configured to allow VPN traffic from client device 157*a* to go through a VPN data tunnel established with Device B 154, destined for another client device on LAN B 156. In this same example, Device A 151 allows network traffic from client devices 157 destined for a $3^{rd}$ party destination 130 to travel over the public/external network 120.

The networking environment 100 includes a contact point network entity (not shown), configured to maintain, obtain and/or report addressing information for networking devices, such as Device A 151 and/or Device B 154. In some embodiments, the contact point network entity is a part of cloud hosted management server 110. In some implementations, the contact point network entity and cloud hosted management server 110 reside on a single network entity, such as a group of servers, a single server machine or portions of several servers that are not dedicated to these services. In some implementations, the contact point network entity resides on a separate and distinct network entity from cloud hosted management server 110, such as a group of servers, a single server machine or portions of several servers that are not dedicated to these services.

In some implementations, the contact point network entity, or cloud hosted management system 110 includes a contact point registry (not shown) for storing contact point information of network devices. In some implementations, the contact point registry includes addressing information for one or more multi-uplink routers of networking environment 100. In some implementations, this addressing information includes uplink identifiers, Internet Protocol (IP) addresses, port numbers, device identifiers, device serial numbers, user-selected device names, geographic location data, client identification (e.g., ABC Coffee Shops or client 2395), and/or device connectivity information. In some implementations, the addressing information stored in the contact point registry includes private addressing information and public addressing information. For example, Uplink 0 172 of network device B 154 operates behind NAT 153, and consequently has a public IP address and public port number that are both accessible and visible from public network 120, and a private IP address and private port number. In some implementations, a set of addressing information for a respective device or for a respective uplink of a multi-uplink device is referred to as contact point information. For example, the contact point network registry has contact point information corresponding to Uplink 0 170 of Device A 151, such as a private IP address, a private port number, a public IP address, a public port number, an uplink identifier and a device identifier.

FIG. 1 illustrates that Device A 151 includes a local peer contact point table, Table A 152 and that Device B 154 includes a local peer contact point table, Table B 155. In some embodiments, one or more networking devices of a private network have a local peer contact point table containing some or all of the contact point information stored at a contact point registry, as described above. In some embodiments, a local peer contact point table has contact point information for peer network devices (including multi-uplink network devices) of a respective network device. In some embodiments, peer network devices of a respective network device are network devices with which the respective network device shares a communication path or data tunnel. For example, Table A 152 of Device A 151 has a private IP address and private port number and public IP address and public port number corresponding to Uplink 0 172 of Device B 154, and similarly for Uplink 1 173 of Device B 154, a peer device to Device A 151.

FIG. 1 also illustrates that Device A 151 includes a set of Performance Parameter Values 180, and that Device B 154 includes a set of Performance Parameter Values 182. In some implementations, a respective network device of a private network has a set of values corresponding to one or more performance parameters of a respective data tunnel associated with the respective network device. For example, there are four established data tunnels between Device A 151 and Device B 154, and the set of Performance Parameter Values 180 includes a value corresponding to the latency of the first tunnel, the jitter of the third tunnel and the latency of the fourth tunnel between Device A 151 and Device B 154.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157*a*, workstation 157*b*, smartphone 157*c*, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

The cloud hosted network management system 110 is configured to manage the configuration and operation of compliant devices in a LAN and/or across geographically distributed portions of a VLAN. To that end, the cloud hosted network management system 110 includes a configuration database 111 for storing configuration information of compliant devices, a cloud hosted management server 112, and in some implementations, a gateway device. In some embodiments, compliant devices are configured to communicate particular information with the cloud hosted network management system 110. For example, compliant devices are configured to share status information, configuration information and/or network traffic information with the cloud hosted network management system 110 and/or other compliant devices. In some embodiments, the network devices, Device A 151 and Device B 154, of FIG. 1 are compliant devices.

In some implementations, a gateway device (not shown) connects the cloud hosted management server 112 to the public network 120 so that the cloud hosted management server 112 is able to communicate with one or more LANs and/or geographically distributed portions of a VLAN, and optionally includes features such as a firewall. In some implementations, a gateway device is provided as a single entity (e.g., a server, a virtual machine, etc.). In some implementations, a gateway device includes a distributed system including a suitable combination of software, data structures, virtual machines, computing devices, servers, switches and routers. Merely for the sake of brevity and convenience of explanation, the optional gateway device is described herein as a single entity.

FIG. 1 illustrates the use of ISP node 140a to link LAN A 150 to the public network 120 using Uplink 0 170, and the use of ISP node 140b to link LAN B 156 to the public network 120 using Uplink 0 172. In some embodiments an ISP node is not required to link a local area network to a public network. In various implementations, ISP nodes 140a and/or 140b are each provided as a single entity (e.g., a server, a virtual machine, etc.). In some implementations, ISP node 140a and/or 140b are each implemented as a distributed system including a suitable combination of software, data structures, virtual machines, computing devices, servers, switches and routers. For the sake of brevity and convenience of explanation, the ISP nodes 140a and 140b are each described herein as a single entity.

FIG. 2A is a block diagram 200 illustrating data tunnels terminating at a multi-uplink network device in accordance with some implementations. In FIG. 2A, example multi-uplink network Device A 151 has two uplinks configured to maintain private network data tunnels (e.g., VPN tunnels) with another network device. In the example shown in FIG. 2A, a multi-uplink network device has two active uplinks for maintaining data tunnels, however those of ordinary skill in the art will appreciate from the present disclosure that in some embodiments, a multi-uplink network device has more than two active uplinks for maintaining data tunnels. In some embodiments, a respective uplink is associated with a respective port of a network device. For example, port 0 202 of Device A 151 is associated with uplink 0 170. In some embodiments, a respective uplink of a network device can be swapped to a new or different port, or replaced with a new uplink. For example, if the IT budget of a branch office increases, it is able to upgrade an Internet uplink by replacing it with an MPLS uplink.

In some implementations, Device A 151 includes local peer contact point table A 152, and Device B 154 includes local peer contact point table B 155, as described above with respect to FIG. 1. In some implementations, Device A 151 includes performance parameter values 180, and Device B 154 includes performance parameter values 182. In some implementations, Device A 151 includes tunnel management module 190, and Device B 154 includes tunnel management module 192. In some implementations, a tunnel management module includes one or more sub-modules for selecting a respective data tunnel between network devices, for the transfer of data packets. For example, tunnel management module 190 includes one or more of a network access module, packet-forwarding rule retrieval module, data tunnel selection module, packet traffic determination module, performance parameter management module, communication module, peer uplink identification module and load-balancing module. Those of ordinary skill in the art will appreciate from the present disclosure that one or more modules of the tunnel management module are implemented in software, hardware, firmware, or any combination thereof. In some implementations, the one or more modules of tunnel management module 190 and/or tunnel management module 192 correspond to one or more modules described below with respect to FIG. 9.

In some embodiments, a multi-uplink network device, such as Device A 151, establishes one or more data tunnels to another network device with one uplink configured to maintain and actively use private network data tunnels. For example, FIG. 2A illustrates two data tunnels associated with Device A 151, Tunnel A 210 and Tunnel B 212, each tunnel having one end associated with one uplink and/or port of Device B 154. In some implementations, this arrangement of maintained data tunnels indicates that Device B is programmed to allow private network (e.g., VPN) traffic over one uplink. In some implementations, this arrangement of maintained data tunnels is indicative that Device B has one uplink, or that it is a multi-uplink network device with one or more uplinks that have gone offline. This example illustrates that multi-uplink network devices are configured to use more than one uplink, and in particular, that they are configured to simultaneously use more than one uplink to maintain a private network data tunnel. In some embodiments, a multi-uplink network device is referred to as an "active-active" network device, because it has at least two uplinks that actively allow for establishing, maintaining and using private network data tunnels at the same time.

FIG. 2B is a block diagram 250 illustrating data tunnels between multi-uplink network devices. In the example of FIG. 2B, Device B 154 is a multi-uplink network device configured to maintain and use private network data tunnels over at least two uplinks. Here, it can be seen that Device A 151 is now able to maintain and/or use four possible private network data tunnels to communicate with Device B 154, where each uplink of Device A 151 is associated with two distinct data tunnels respectively associated with the two uplinks of Device B 154.

In some implementations, Device A 151 includes local peer contact point table A 152, and Device B 154 includes local peer contact point table B 155, as described above with respect to FIG. 1. In some implementations, Device A 151 includes performance parameter values 180, and Device B 154 includes performance parameter values 182. In some implementations, Device A 151 includes tunnel management module 190, and Device B 154 includes tunnel management module 192. In some implementations, a tunnel management module includes one or more sub-modules for selecting a respective data tunnel between network devices, for the transfer of data packets. For example, tunnel management module 190 includes one or more of a network access module, packet-forwarding rule retrieval module, data tunnel selection module, packet traffic determination module, performance parameter management module, communication module, peer uplink identification module and load-balancing module. Those of ordinary skill in the art will appreciate from the present disclosure that one or more modules of the tunnel management module are implemented in software, hardware, firmware, or any combination thereof. In some implementations, the one or more modules of tunnel management module 190 and/or tunnel management module 192 correspond to one or more modules described below with respect to FIG. 9.

In some embodiments, establishing a respective data tunnel between Device A 151 and Device B 154 requires knowledge of specific addressing information corresponding to each respective uplink and/or port associated with the data tunnel. For example, if Device A 151 is the multi-uplink networking device initiating establishment of a data tunnel, it must obtain contact point information corresponding to uplink 0 172 and uplink 1 173 of Device B 154. In some embodiments, Device A 151 obtains this uplink-specific contact point information from its local peer contact point table A 152. In some embodiments, Device A 151 obtains this uplink-specific contact point information from another source, such as a contact point network entity, as described with respect to FIG. 1.

In some embodiments, after establishing a respective data tunnel, and after Device A 151 obtains contact point information for the uplinks of network devices in a private network such as Device B 154, it receives a packet or group of packets to send to a particular network device, such as Device B 154. In some implementations, this packet or group of packets is received at Device A 151 from a client device of an associated LAN, such as one of client devices 157 of LAN A 150, in FIG. 1.

In some implementations, there is one established data tunnel between Device A 151 and the destination network device for the received packet or group of packets, and therefore one choice for selecting a data tunnel to transport the packet or group of packets. However, as shown in FIG. 2B, in some implementations both Device A 151 and the destination network device, such as Device B 154, are multi-uplink network devices with a plurality of established private network data tunnels. In this example, Tunnel A 210 and Tunnel C 214 are associated with Uplink 0 170 of Device A 151, and Tunnel B 212 and Tunnel D 216 are associated with Uplink 1 171 of Device A. In some implementations, in accordance with a determination that there is a plurality of data tunnels established between a first network device and a second network device, the first network device retrieves and uses one or more packet-forwarding rules to select a tunnel for sending one or more packets to the second network device. For example, Device A 151 receives a group of packets associated with credit card transactions, and retrieves a packet-forwarding rule requiring this traffic to be sent over a data tunnel associated with Uplink 1 171.

In some implementations, a set of packet-forwarding rules for a respective network device includes one or more policy-based rules and one or more performance-based rules. Performance-based rules correspond to measured or determined performance characteristics of one or more data tunnels between respective network devices. For example, a performance-based rule for sending voice over IP (VoIP) traffic from Device A 151 to Device B 154 dictates selecting a data tunnel with less than 2 ms of jitter. In some implementations, one or more performance-based rules are associated with a particular type of traffic. For example, a particular performance-based rule applies to all web traffic for a video-hosting website. In some implementations, a respective performance-based rule is based on a fixed value, a fixed range or less than or greater than a fixed value for one or more performance parameters. For example, the previously described performance-based rule dictates that VoIP traffic be sent from Device A 151 to Device B 154 through a data tunnel with less than 2 ms of jitter. In some implementations, a performance-based rule is based on qualitative information relying on one or more performance parameter values, such as the data tunnel with the best overall quality of service. For example, a data tunnel with the best overall quality of service is determined to have the best combination of low jitter, high reliability, a low error rate, a high bit rate, and/or a low transmission delay.

Performance-based rules rely on a set of performance parameter values, such as Performance Parameter Values 180 stored at Device A 151. In some implementations, Performance Parameter Values 180 include quantitative and/or qualitative information corresponding to one or more data tunnels associated with Device A 151. For example, the set of Performance Parameter Values 180 includes jitter, delay and reliability values for all the data tunnels between Device A 151 and Device B 154. In some implementations, a respective network device has performance parameter values corresponding to data tunnels between the respective network device and a plurality of network devices.

In the example of FIG. 2B, in some implementations, Device A 151 obtains one or more performance parameter values corresponding to a respective private network data tunnel. For example, Device A 151 retrieves jitter, latency and throughput values for Tunnel A 210, and stores these values in Performance Parameter Values 180. In some implementations, Device A 151 sends one or more test packets through a respective data tunnel to a second network device. For example, Device A 151 sends two test packets through Tunnel A 210 to Device B 154. Additionally, in some implementations, Device A 151 obtains one or more feedback packets from Device B 154 through the same respective data tunnel. In some implementations the one or more feedback packets correspond to the one or more test packets. For example, Device B 154 receives the two test packets from Device A 151, and generates and sends two feedback packets corresponding to the two test packets through Tunnel A 210 to Device A 151. In some implementations, one or more performance parameters are assessed from the obtained feedback packets, and Device A 151 correspondingly updates its own set of performance parameter values. In some implementations, a respective network device is able to assess one or more test packets received via a particular data tunnel and correspondingly update its own set of performance parameter values for the particular data tunnel.

Policy-based rules are often defined for routing packets in a particular way, throughout a private network. For example, a network administrator determines that all web-surfing traffic will be sent from Device A 151 to Device B 154 through either Tunnel A 210 or Tunnel C 214. In some implementations, one or more policy-based rules are associated with a particular type of traffic. For example, a particular policy-based rule applies to all video conferencing traffic.

In the example of FIG. 2B, Device A 151 receives a packet or group of packets to send to Device B 154. In some implementations, Device A 151 determines a network traffic type corresponding to the packet or group of packets. For example, Device A 151 determines that it has received a group of video conferencing packets from a personal computer. Device A 151 uses this determined network traffic type to select a suitable data tunnel through which to send the packet or group of packets. In some implementations, Device A 151 accomplishes this by obtaining one or more packet-forwarding rules for forwarding the packet or group of packets, based on the determined network traffic type. For example, Device A 151 retrieves a policy-based rule corresponding to video conferencing network traffic. In some implementations, the one or more packet-forwarding rules includes a performance-based rule, and one or more performance parameter values are also retrieved for each available data tunnel.

In some implementations, a respective network device, such as Device A 151, selects a first data tunnel, such as Tunnel D 216, for forwarding some or all of the packets in a group of packets received from a client device, based on satisfaction of the one or more retrieved packet-forwarding rules. Device A 151 forwards one or more packets through Tunnel D 216 to Device B 154, and subsequently receives a reply message from Device B 154. In some implementations, the reply message from Device B 154 is received through Tunnel D 216, the same data tunnel selected for sending the one or more packets. In some implementations, Device B 154 returns the reply message through a different data tunnel, such as Tunnel B 212. In some implementations, Device A 151 sends any remaining packets from the group of packets received from the client device through the data tunnel selected by Device B 154 for sending the reply message to Device A 151. In some implementations, Device A 151 selects a third data tunnel distinct from the data tunnel it selected to send packets to Device B 154, and distinct from the data tunnel selected by Device B 154 to send a reply message, for sending any remaining packets from the group of packets.

In some implementations, a second network device receiving one or more packets from a first network device through a first data tunnel, selects a second, different, data tunnel for sending back a reply message because the second network device has a policy-based rule in place preventing the network traffic type of the one or more packets from being transported via the uplink associated with the first data tunnel. In some implementations, the first network device stores historical tunnel selection information, including preferences of its peer networks. For example, if Device A 151 selected Tunnel A 210 for forwarding VoIP packets to Device B 154, but it received reply packets through Tunnel B 212, Device A 151 records that Device B prefers to receive VoIP packets through data tunnels associated with Uplink 1 173.

Figure 3:
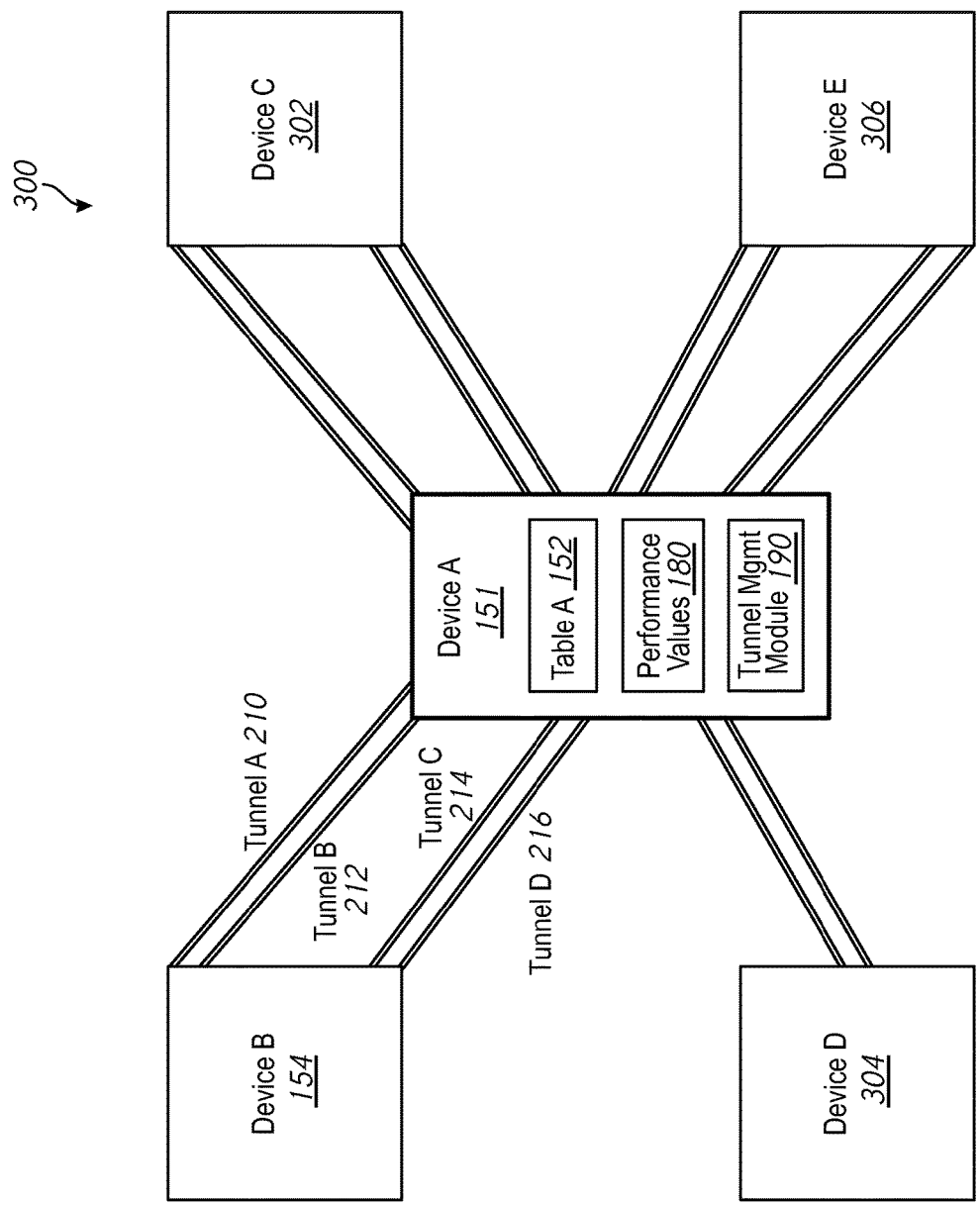
FIG. 3 is a block diagram illustrating an example of a hub and spoke topology of a network of multi-uplink network devices in accordance with some implementations.

FIG. 3 is a block diagram of an example networking environment 300 illustrating a hub and spoke topology of multi-uplink network devices in accordance with some implementations. In some implementations, network devices, including multi-uplink network devices, are networked with each other in various arrangements. A hub-and-spoke topology, such as the one shown in FIG. 3 is one possible arrangement for network devices in a private network. For example, in networking environment 300, Device A 151 is a hub network device, and Device B 154, Device C 302, Device D 304 and Device E 306 are all spoke network devices in direct communication with Device A 151. FIG. 3 shows that Device A 151 is coupled to multi-uplink Device B 154 via four separate data tunnels, namely, Tunnel A 210, Tunnel B 212, Tunnel C 214 and Tunnel D 216. Additionally, Device A 151 is coupled to multi-uplink Device C 302 via four separate data tunnels, coupled to Device E 306 via four separate data tunnels and coupled to Device D 304 via four separate data tunnels. An alternative topology is a mesh arrangement where all or most of the network devices of a networking environment are in direct communication with each other.

In some implementations, Device A 151 includes local peer contact point table A 152, and performance parameter values 180. In some implementations, Device A 151 includes tunnel management module 190. In some implementations, a tunnel management module includes one or more sub-modules for selecting a respective data tunnel between network devices, for the transfer of data packets. For example, tunnel management module 190 includes one or more of a network access module, packet-forwarding rule retrieval module, data tunnel selection module, packet traffic determination module, performance parameter management module, communication module, peer uplink identification module and load-balancing module. Those of ordinary skill in the art will appreciate from the present disclosure that one or more modules of the tunnel management module are implemented in software, hardware, firmware, or any combination thereof. In some implementations, the one or more modules of tunnel management module 190 correspond to one or more modules described below with respect to FIG. 9.

In the example hub and spoke topology of FIG. 3, Device A 151, the hub, is involved in the establishment, maintenance, selection and use of 14 different data tunnels among the five displayed network devices. As additional network devices join networking environment 300, Device A 151 experiences an increasingly complex task of managing the many data tunnels it is associated with. One attribute of networking environment 300 that assists Device A 151, as well as all the other network devices of the private network, is the use of uplink identifiers for respective uplinks of Device A 151 and/or respective uplinks of the other network devices of networking environment 300. In some implementations, as described earlier, Device A 151 stores uplink identifiers along with other contact point information in its local peer contact point table A 152. In some implementations, a respective data tunnel in networking environment 300, is associated with two uplinks, and two corresponding uplink identifiers. For example, Tunnel C 214, as depicted in FIG. 2B in more detail, is associated with Uplink 0 170 of Device A 151 and Uplink 1 173 of Device B 154. Associating a respective data tunnel with its two corresponding uplinks and uplink identifiers provides additional characteristic information for the respective data tunnel. For example, Tunnel A 210 in FIG. 3 is associated with Uplink 0, an MPLS uplink of Device A 151 and Uplink 0, an Internet uplink, of Device B 154. In some implementations, a respective data tunnel is also associated with two network device ports.

FIG. 4A is a table 400 representing the contents of an example contact point registry in accordance with some implementations. Table 400 has entries 416, 418, 420, 422, 424, 426, 428, 430, 432 and 434 each corresponding to a respective uplink of a respective network device. In some implementations, contact point information is indexed in the contact point registry, on the basis of network devices, and sub-indexed by uplinks of respective network devices (e.g., using device and uplink identifiers). In some implementations, a subset of a respective uplink's contact point information is referred to as public contact point information and another subset of the uplink's contact point information is referred to as private contact point information. In some implementations, an uplink of a networking device has corresponding private contact point information and public contact point information that is the same.

Within table 400, column 402 stores one or more device identifiers for each respective network device. In this example distinct alphanumeric characters are used to identify respective network devices, however those of ordinary skill in the art will appreciate from the present disclosure that in some embodiments, this is not a limiting example of unique identifiers of network devices of a given network (or private network). In some implementations, more than one identifier is stored for a respective network device (e.g., a user-selected name and a unique system-generated number). In some implementations, a network device has an identifier that is unique among all compliant network devices in existence, even beyond the given network.

Column 404 stores uplink identifiers for respective uplinks of each network device. In some implementations, respective uplink identifiers are unique for a respective network device, as shown in table 400. In this example distinct alphanumeric characters are used to identify respective uplinks, however those of ordinary skill in the art will appreciate from the present disclosure that in some embodiments, this is not a limiting example of unique identifiers of uplinks of a given network device. In some implementations, an uplink for a respective network device has an identifier that is unique amongst all uplinks of network devices in existence, even beyond the given network. Column 406 stores information about the type of connection associated with a respective uplink. For example, entry 428 shows that Uplink 0 of Device D is an MPLS connection.

Column 408 illustrates an example of how private contact point information can be stored. In some implementations, private contact point information associated with a respective uplink of a respective network device includes a pair of a private IP address and a private port number. For example, entry 416 shows that the private contact point information of Uplink 0 of Device A includes the private IP address 10.0.10.0 and private port number of 50234. Column 410 illustrates an example of stored public contact point information. In some embodiments, public contact point information associated with a respective network device includes a pair of a public IP address and a public port number. In some implementations, the private contact point information and public contact point information for a respective device are the same. For example, Uplink 0 of Device A in entry 416 has the same IP address and port number for both since there is no intermediate NAT device between Uplink 0 of Device A and the contact point network entity, as shown in FIG. 1.

In some implementations, the contact point registry has a column 412 for storing the peer devices of a respective network device. For example, in entry 420, associated with Device A, it is shown that Device B, Device C, Device D and Device E are peers of Device A, as illustrated in FIG. 3. In some implementations, the peer devices of a respective network device are determined from one or more received uplink-specific registry request messages from the respective network device. In some implementations, table 400 includes a column corresponding to peer device uplinks instead of, or in addition to column 412. In some implementations, a respective uplink of a multi-uplink network device is configured to establish data tunnels with specific uplinks of another multi-uplink network device. In these implementations the contact point registry includes information about peer device uplinks for a respective uplink in table 400.

Entry 430 corresponding to Uplink 1 of Device D has empty fields for private contact point information and public contact point information. In some embodiments, empty contact point information indicates that the respective uplink of a respective network device is offline or exhibiting a communication problem with the contact point network entity.

In some implementations, information such as the information shown in column 414 is included in the contact point registry, to indicate the nature of a respective network device in a particular network topology. For example, the network that includes Device A, Device B, Device C, Device D and Device E, has a hub and spoke topology, where one or more network devices is a "hub" device connected to at least two other network devices, and one or more network devices is a "spoke" device connected to one other network device. Alternative topologies may be implemented for a given network, and as such, the contact point registry may include information for each respective network device, for those alternative topologies. The columns and information shown in FIG. 4A are merely examples of the type of information found in a contact point registry, however those of ordinary skill in the art will appreciate from the present disclosure that in some embodiments, the contact point registry includes additional information (e.g., status information, or time since last registry request message received), or less information than shown.

FIG. 4B is an example of a local peer contact point table 450 in accordance with some implementations. For example, local peer contact point table 450 is stored at Device A 151 as Table A 152, in FIG. 1. Table 450 has entries 464, 466, 468, 470, 472, 474, 476, and 478, each corresponding to a respective uplink of a respective peer network device. In some implementations, table 450 includes a subset of the information in the contact point registry, in columns such as peer device identifier 452, uplink identifier 454, uplink type 456, peer device private contact point information 458 and peer device public contact point information 460. Although, in some implementations table 450 includes additional information, such as status column 462. The example in FIG. 4B shows that Device A has four peer multi-uplink devices, Device B, Device C, Device D and Device E. In this example, private contact point information 458 is stored for each peer device uplink, including a private IP address and private port number for each respective uplink of each respective peer network device. Additionally, peer device public contact point information 460 is stored, and in this case that includes storing a public IP address and public port number for each respective peer device uplink. Table 450 also includes a status column 462, to store an indicator of whether or not a respective uplink of a respective peer network device is online or offline. For example, entry 474 corresponding to Uplink 1 of Device D indicates that this uplink is offline, while entry 470 corresponding to Uplink 1 of Device C indicates that this uplink is online. In some implementations, Device D, as depicted in FIGS. 4A and 4B, is a single-uplink network device, rather than a multi-uplink network device with one offline uplink.

Figure 5A:
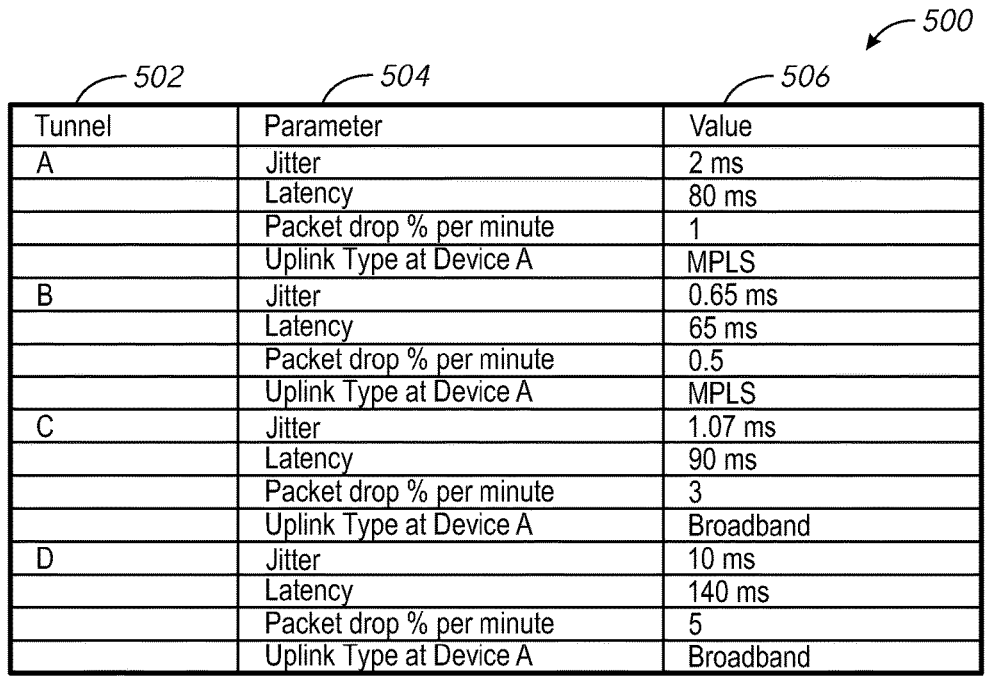
FIG. 5A is an example of a table of data tunnel performance parameter values in accordance with some implementations.

FIG. 5A is an example of a table 500 of data tunnel performance parameter values in accordance with some implementations. Table 500 includes, in this example, information stored in columns such as tunnel 502, parameter 504 and value 506. As an example, performance parameter values table 500 corresponds to performance parameter values 180 of Device A 151, as described earlier with respect to FIG. 1, FIGS. 2A and 2B and FIG. 3. The columns and information shown in FIG. 5A are merely examples of the type of information found in a set of data tunnel performance parameter values, however those of ordinary skill in the art will appreciate from the present disclosure that in some embodiments, performance parameter values table 500 includes different or additional information. In some implementations, performance parameter values table 500 includes qualitative and/or quantitative information. For example, performance parameter values table 500 includes quantitative data for jitter and latency values, but qualitative data for the type of uplink associated with a respective data tunnel.

In the example of FIG. 5A, tunnel column 502 includes a unique identifier for a respective data tunnel. In some implementations, every data tunnel of a respective private network has a unique identifier. In some implementations, every data tunnel of a respective pair of network devices has a unique identifier. In some implementations, additional information found in table 500 includes uplink identifiers associated with a respective data tunnel, throughput, bandwidth, a number of packet-forwarding rules associated with the respective data tunnel and/or a time stamp or duration of time since the last update of the performance parameter values for the respective data tunnel. In some implementations, table 500 also includes a device identifier corresponding to a respective data tunnel.

Table 500 shows various performance parameters in column 504 and various values corresponding to those parameters in column 506. In some implementations, performance parameter values in column 506 are null or zero, for a respective data tunnel. For example, the latency value for tunnel A is null until at least ten test packets have been transferred through tunnel A and evaluated for this particular parameter.

Figure 5B:
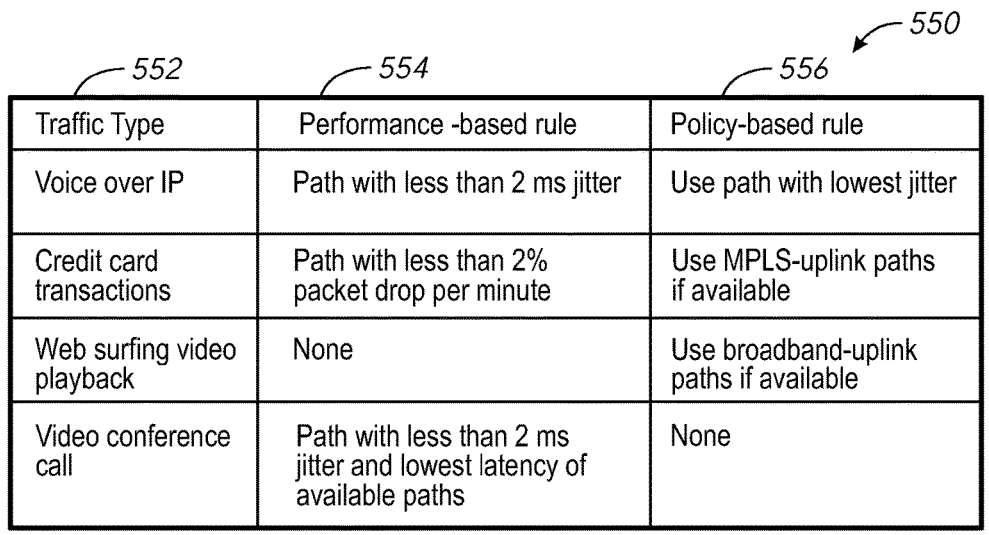
FIG. 5B is an example of a table of packet-forwarding rules in accordance with some implementations.

FIG. 5B is an example of a table 550 of packet-forwarding rules in accordance with some implementations. Packet-forwarding rule table 550 includes traffic type column 552, performance-based rule column 554 and policy-based rule column 556. Table 550 illustrates examples of performance-based rules as well as policy-based rules for various types of identified network traffic types. Table 550 shows that forwarding credit card transaction packets, in this example, requires following a performance-based rule and a policy-based rule. In some implementations, if a respective network traffic type is associated with a performance-based rule and a policy-based rule, satisfaction of the policy-based rule is given precedence if it is not possible to satisfy both rules. In some implementations, if a respective network traffic type is associated with a performance-based rule and a policy-based rule, satisfaction of the performance-based rule is given precedence if it is not possible to satisfy both rules. In some implementations a default data tunnel is assigned at a respective network device for all data packets, or for all data packets of a particular network traffic type. In some implementations, a respective traffic type is not associated with a performance-based rule or a priority-based rule.

Figure 6:
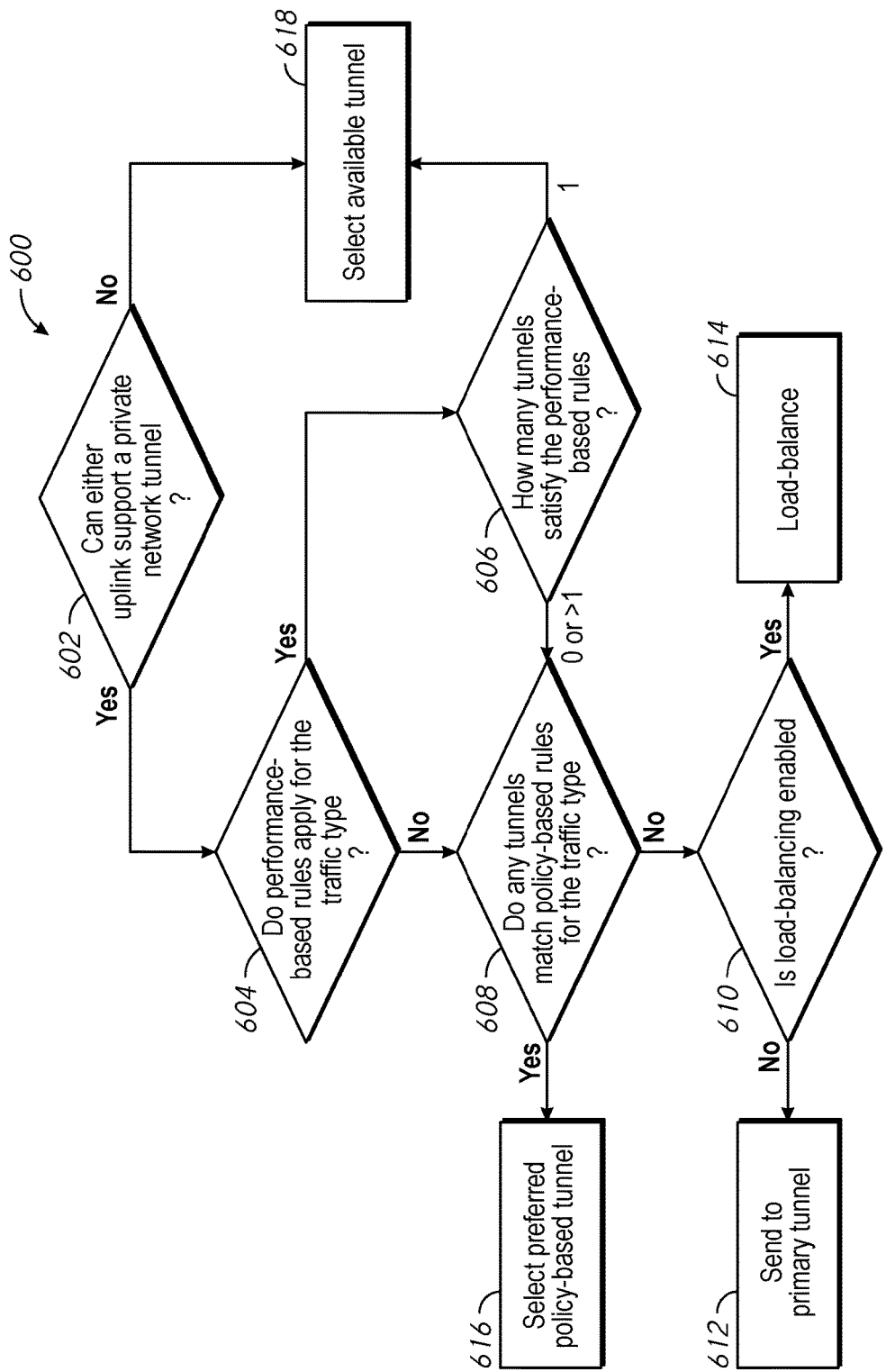
FIG. 6 is a flowchart representation of a method of selecting private network data tunnels between multi-uplink network devices in accordance with some implementations.

FIG. 6 is a flowchart representation of a method 600 of selecting private network data tunnels for the transfer of one or more packets, between multi-uplink network devices in accordance with some implementations. For the sake of additional clarity and detail, the method 600 is described with reference to FIG. 1, FIGS. 2A and 2B, and FIGS. 5A and 5B. In some implementations, method 600 is performed at a multi-uplink network device, such as Device A 151 or Device B 154, in FIG. 1. In some implementations, method 600 is performed at a device operating as a router and/or as a gateway node. In some implementations, method 600 is performed by one or more devices in communication with each other through a private network, such as a VPN.

Briefly, the method 600 includes selecting a data tunnel from a plurality of data tunnels between a first network device and a second network device, for forwarding one or more packets from the first network device to the second network device. In some implementations, this selection process includes making determinations of which data tunnels of the plurality of data tunnels match or satisfy one or more performance-based rules and/or one or more policy-based rules. In some implementations, method 600 occurs after a particular network traffic type has been determined for the one or more packets being forwarded from the first network device to the second network device.

To that end, as represented by block 602, the method 600 includes determining whether either (or all) of the uplinks of the first network device can support a private network tunnel, as described above with respect to FIGS. 1, 2A, 2B and 3. For example, a tunnel selection module of tunnel management module 190 of Device A 151 in FIG. 1 is configured to perform this determination. If the answer is no ("No" path from block 602), at least one uplink of the network device cannot support establishing or maintaining a private network and as represented by block 618, the method 600 includes selecting a data tunnel based on performance-based rules rather than policy-based rules. For example, the selection of the data tunnel is performed by the tunnel selection module of the tunnel management module 190 of Device A 151 in FIG. 1. If either (or all) of the uplinks of the first network device can support a private network data tunnel, as represented by block 604, the method 600 includes determining whether any data tunnels match performance-based rules for the particular network traffic type of the packets to forward. For example, a packet traffic determination module of tunnel management module 190 of Device A 151 in FIG. 2B, determines the particular network traffic type of the packets, a performance parameter management module retrieves one or more performance parameters for each data tunnel, a packet-forwarding rule retrieval module retrieves one or more performance-based rules for each data tunnel, and data tunnel selection module determines whether any data tunnels match performance-based rules for the particular network traffic type of the packets to forward.

In some implementations, at least one data tunnel does match the one or more performance-based rules for the particular network traffic type ("Yes" path from block 604), and method 600 includes making a determination represented by block 606 of how many tunnels satisfy the one or more performance based rules. In some implementations, if one data tunnel satisfies the one or more performance-based rules, the data tunnel is selected on the basis of the satisfied performance-based rules, as represented by block 618. For example, a data tunnel selection module of tunnel management module 190 of Device A 151 in FIG. 2B, determines how many tunnels satisfy the one or more performance-based rules.

In some implementations, there are no data tunnels that satisfy the one or more performance-based rules for the particular network traffic type, ("No" path from block 604). In some implementations, a plurality of data tunnels satisfies the one or more performance-based rules, as determined after the decision represented by block 606. In these implementations, method 600 includes making a decision represented by block 608 of whether any of the data tunnels satisfy, or match, one or more policy-based rules for the particular network traffic type of the packets to forward. For example, a packet-forwarding rule retrieval module of tunnel management module 190 of Device A 151 in FIG. 2B, retrieves one or more policy-based rules for each data tunnel, and data tunnel selection module determines whether any data tunnels match policy-based rules for the particular network traffic type of the packets to forward.

In some implementations, none of the data tunnels match or satisfy the one or more applicable policy-based rules ("No" path from block 608), and a decision is made regarding whether load-balancing is enabled or not, as represented by block 610. For example, a load-balancing module of tunnel management module 190 of Device A 151 in FIG. 2B, determines that load-balancing is enabled. In some implementations, a load-balancing technique of method 600 includes an objective to evenly spread network traffic across all available data tunnels between the first network device and another network device. In some implementations, load-balancing is enabled ("Yes" path from block 610), and the data tunnel is selected on the basis of load-balancing, as represented by block 614. In some implementations, load-balancing is not enabled ("No" path from block 610), and a primary, default or predetermined data tunnel is selected, as represented by block 612. In some implementations, one or more data tunnels also match or satisfy the one or more policy-based rules ("Yes" path from block 608). In these implementations, the most preferred or ideal data tunnel of the ones that satisfy the one or more policy-based rules is selected, as represented by block 616. For example, a data tunnel selection module of tunnel management module 190 of Device A 151 in FIG. 2B, selects the most preferred data tunnel of the ones that satisfy the one or more policy-based rules.

Figure 7:
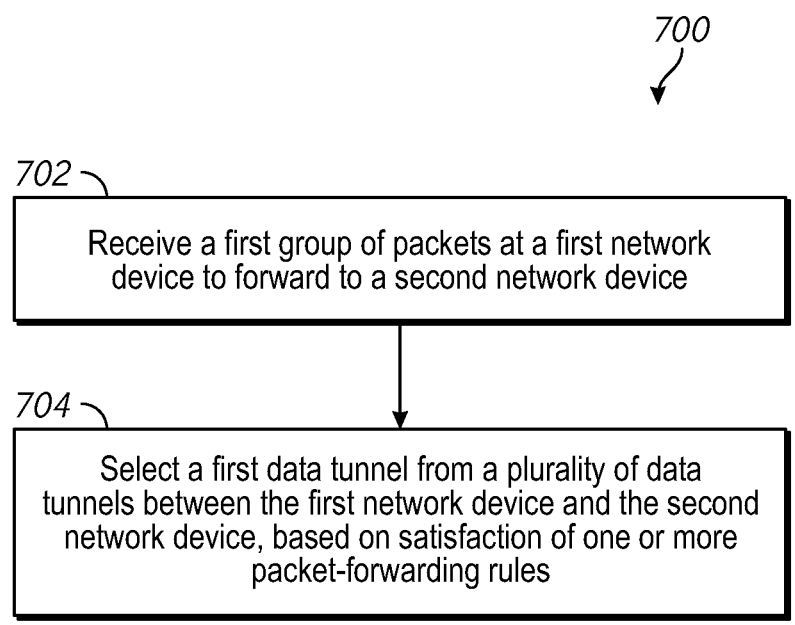
FIG. 7 is a flowchart representation of a method of selecting private network data tunnels between multi-uplink network devices in accordance with some implementations.

FIG. 7 is a flowchart representation of a method 700 of selecting private network data tunnels between multi-uplink network devices in accordance with some implementations. For the sake of additional clarity and detail, the method 700 is described with reference to FIG. 1, FIGS. 2A and 2B, and FIGS. 5A and 5B. In some implementations, method 700 is performed at a multi-uplink network device, such as Device A 151 or Device B 154, in FIG. 1. In some implementations, method 700 is performed at a device operating as a router and/or as a gateway node. In some implementations, method 700 is performed by one or more devices in communication with each other through a private network, such as a VPN.

As represented by block 702, the method 700 includes a first network device receiving a first group of packets to forward to a second network device. For example, in FIG. 2B, Device A 151 receives a first group of packets to forward to Device B 154. In this example, a communication module of tunnel management module 190, receives and/or processes the first group of packets. In some implementations, there is a network traffic type associated with the received group of packets. As represented by block 704, the method 700 includes the first network device selecting a first data tunnel from a plurality of data tunnels between the first network device and the second network device, based on satisfaction of one or more packet-forwarding rules. For example, a data tunnel selection module of tunnel management module 190 of Device A 151 in FIG. 2B, selects a first data tunnel for forwarding the first group of packets, based on satisfaction of one or more packet-forwarding rules retrieved by a packet-forwarding module of tunnel management module 190. FIG. 2B also illustrates a plurality of established data tunnels between Device A 151 and Device B 154, for Device A 151 to select from.

Figure 8A:
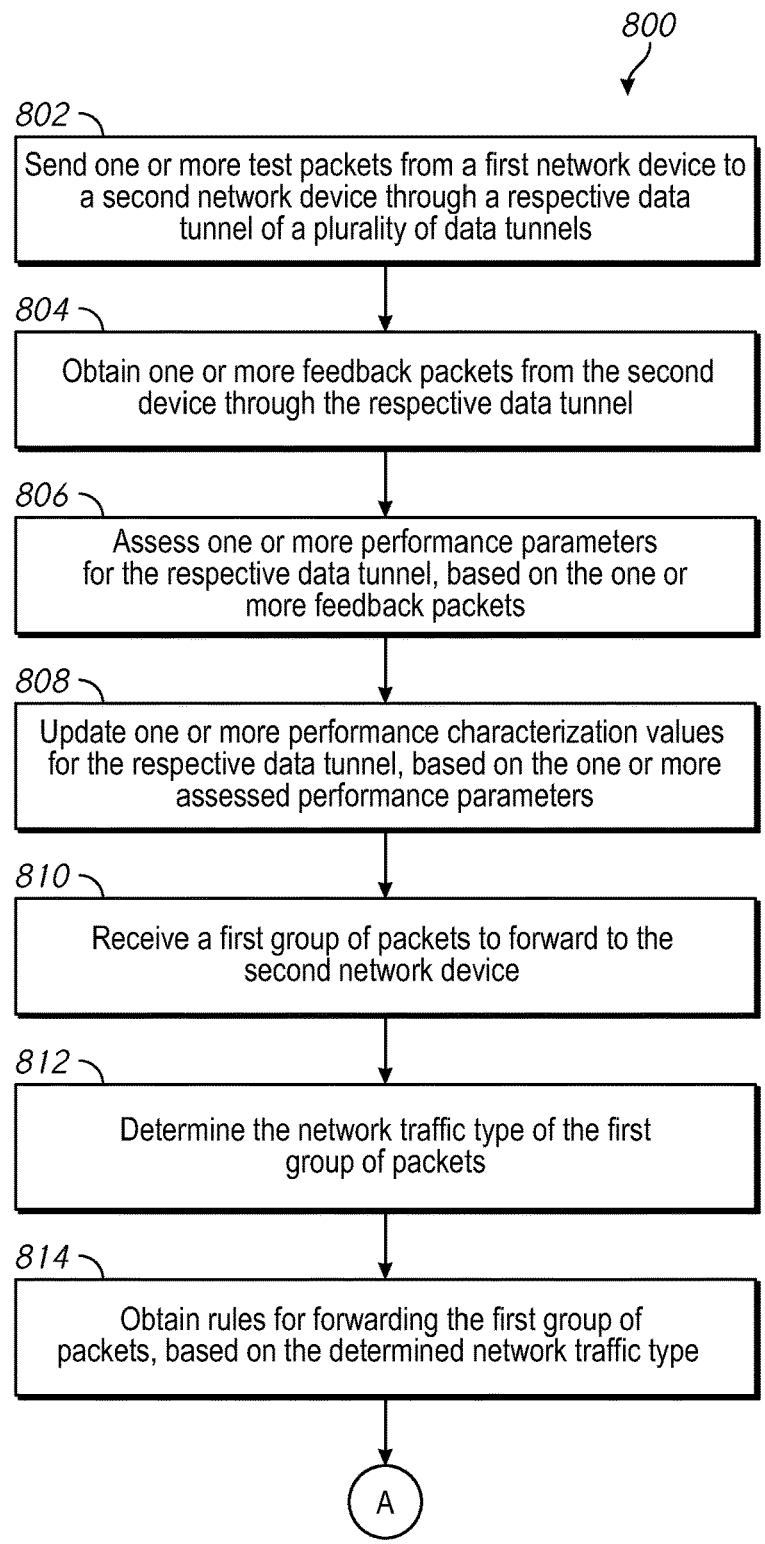
FIGS. 8A-8B provide a flowchart representation of a method of selecting private network data tunnels between multi-uplink network devices in accordance with some implementations.
Figure 8B:
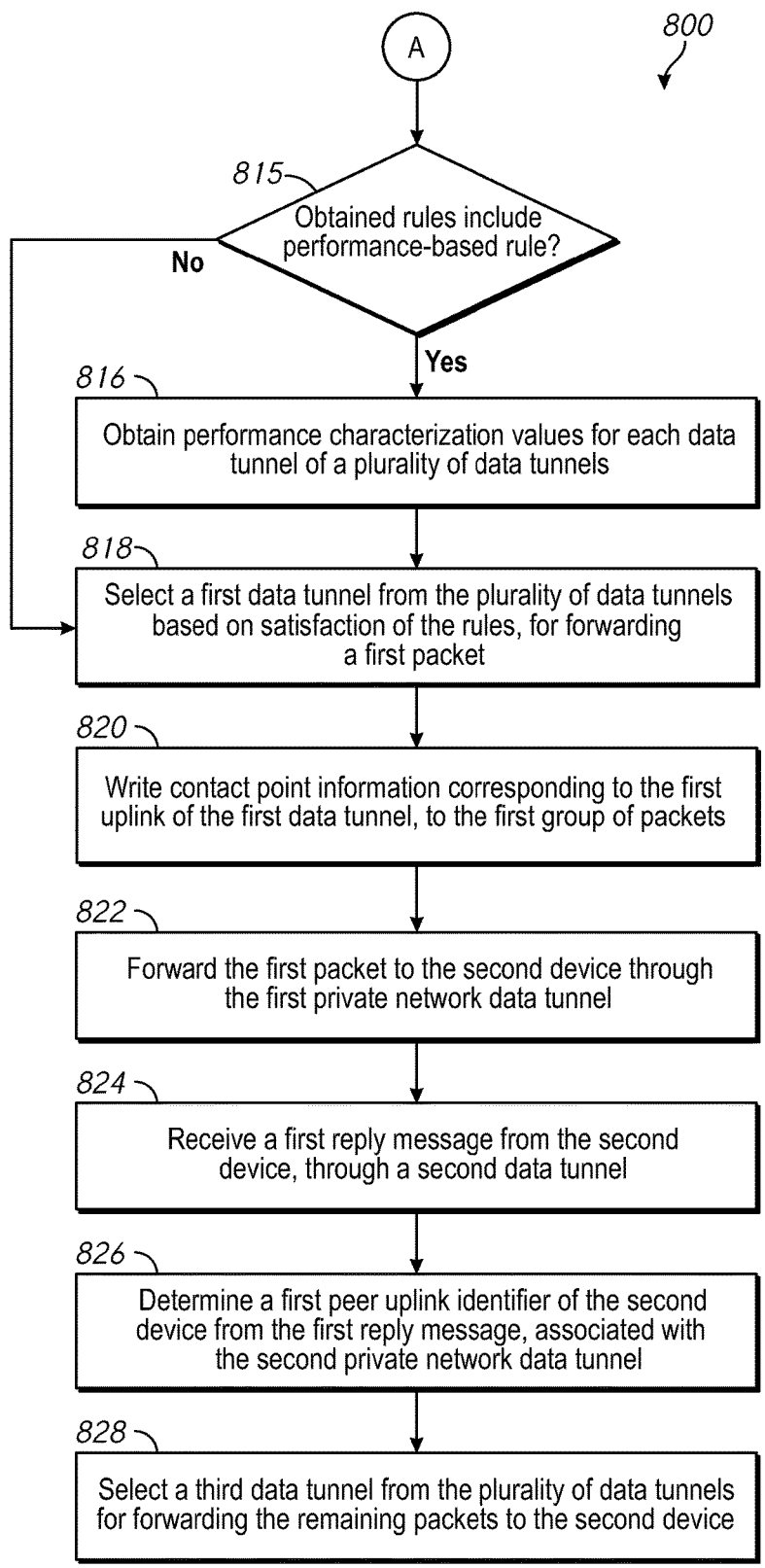

FIGS. 8A-8B provide a flowchart representation of a method 800 of selecting private network data tunnels between multi-uplink network devices in accordance with some implementations.

In some implementations, method 800 is an extension or a more detailed process for performing some or all of the activities of methods 600 and 700 described earlier. As such, for the sake of efficiency, reference is made, when appropriate, to corresponding activities in method 600 or method 700. For the sake of additional clarity and detail, the method 800 is described with reference to FIG. 1, FIGS. 2A and 2B, FIG. 3, FIGS. 4A and 4B, FIG. 5A and FIG. 5B. In some implementations, method 800 is performed at a multi-uplink network device, such as Device A 151 or Device B 154, in FIG. 1. In some implementations, method 800 is performed at a device operating as a router and/or as a gateway node. In some implementations, method 800 is performed by one or more devices in communication with each other through a private network, such as a VPN.

Briefly, the method 800 includes selecting a data tunnel from a plurality of data tunnels between a first network device and a second network device, for forwarding one or more packets from the first network device to the second network device. In some implementations, this selection process includes making determinations of which data tunnels of the plurality of data tunnels match or satisfy one or more performance-based rules and/or one or more policy-based rules. In some implementations, method 800 includes determining one or more performance-based characteristics of one or more data tunnels, used in the selection process.

To that end, as represented by block 802, the method 800 includes a first network device sending one or more test packets or performance packets to a second network device through a respective data tunnel of the plurality of data tunnels. For example, a performance parameter management module of tunnel management module 190 of Device A 151 in FIG. 2B, generates and sends one or more test packets to Device B 154, through Tunnel A 210. In some implementations a plurality of test packets or performance packets are sent, rather than a single packet, to evaluate if any packets are dropped or received by the second network device out of order. In some implementations, the first network device writes contact point information corresponding to the uplink and/or port of the first network device associated with the respective data tunnel, such as an uplink identifier, port number and/or tunnel identifier.

Method 800 includes, as represented by block 804, obtaining one or more performance-feedback packets from the second network device through the respective data tunnel. For example, the performance parameter management module of tunnel management module 190 of Device A 151 in FIG. 2B, obtains one or more performance-feedback packets from Device B 154, through Tunnel A 210. In some implementations, a respective performance-feedback packet corresponds to a respective test packet. In some implementations, the first network device receives the one or more performance-feedback packets from the second network device, but in some implementations it retrieves them.

As represented by block 806, the method 800 includes assessing one or more performance parameters for the respective data tunnel, based on the one or more obtained performance-feedback packets. For example, the jitter, throughput, bandwidth, packet drop rate and/or latency of the respective data tunnel are assessed by comparing the time stamps or other characteristics of the one or more test packets and the one or more performance-feedback packets. As represented by block 808, the method 800 includes updating one or more performance characterization values for the respective data tunnel, based on the one or more assessed performance parameters. In the previous example, the performance parameter management module of tunnel management module 190 of Device A 151 in FIG. 2B, assesses the one or more performance parameters for Tunnel A 210, and updates one or more performance parameters for Tunnel A 210, in set of performance values 180. While the portion of the method 800 represented by blocks 802, 804, 806 and 808 have been discussed with respect to a single data tunnel between the first network device and a second network device, those skilled in the art will appreciate from the present disclosure that in some implementations this portion of the method 800 is performed for one or more additional data tunnels associated with the first network device.

As represented by block 810, the method 800 includes the first network device receiving a first group of packets to forward to a second network device. For example, a communication module of tunnel management module 190 of Device A 151 in FIG. 1, receives the first group of packets to forward to Device B 154. In this example, as shown in FIG. 1, Device A 151 receives a group of packets from a client device 157 of LAN A 150 to send to another client device of LAN B 156 of Device B 154. In some implementations, the group of packets includes one or more types or characteristics of network traffic. For example, the group of packets includes text-based document editing network traffic and is affiliated with a third-party cloud-based document storage website. As represented by block 812, the method 800 includes determining the one or more network traffic types or characteristics associated with the first group of packets.

The method 800 continues, as represented by block 814, with obtaining one or more packet-forwarding rules for forwarding the first group of packets. In some implementations, as shown in FIG. 8A, the one or more packet-forwarding rules are obtained or retrieved based on the determined network traffic type or types of the first group of packets. In some implementations, a set of packet-forwarding rules is a super-set of various types of rules, including performance-based rules and policy-based rules. For example, a packet-forwarding rule retrieval module of tunnel management module 190 of Device A 151 in FIG. 2B, retrieves one or more packet-forwarding rules for each data tunnel, and a packet traffic determination module determines a network traffic type associated with the first group of packets.

As represented by block 815, the method 800 includes determining if any of the obtained packet-forwarding rules include one or more performance-based rules. If the one or more obtained packet-forwarding rules include at least one performance-based rule ("Yes" path from block 815), as represented by block 816, the method 800 includes obtaining one or more performance parameter or characterization values for each respective data tunnel of a plurality of data tunnels between the first network device and the second network device. For example, a packet-forwarding rule retrieval module of tunnel management module 190 of Device A 151 in FIG. 2B, retrieves one or more performance-based rules for each data tunnel, and a performance parameter management module retrieves one or more performance parameters. For example, as shown in FIG. 5B, if the network traffic type of the first group of packets is determined to be VoIP, the packet-forwarding rules for VoIP traffic include a performance-based rule to find a path with less than 2 ms of jitter. In this example, at least the jitter value for each respective data tunnel is obtained. In some implementations, performance parameter or characterization values are obtained for each data tunnel between the first network device and the second network device, in order to compare the values to the one or more performance-based rules. The method 800 includes, as represented by block 818, selecting a first data tunnel from the plurality of data tunnels based on satisfaction of the packet-forwarding rules.

Returning to block 815, if the one or more obtained packet-forwarding rules do not include at least one performance-based rule ("No" path from block 815), as represented by block 818, the method 800 includes selecting a first data tunnel from the plurality of data tunnels based on satisfaction of the packet-forwarding rules. In some implementations, this selection includes determining satisfaction of one or more policy-based rules of the obtained packet-forwarding rules for the determined network traffic type of the first group of packets. For example, a packet-forwarding rule retrieval module of tunnel management module 190 of Device A 151 in FIG. 2B, retrieves one or more policy-based rules for each data tunnel, and a data tunnel selection module selects a first data tunnel from the plurality of data tunnels.

Method 800 includes, as represented by block 820, writing contact point information corresponding to the first uplink of the first network device associated with the first data tunnel, to one or more packets of the first group of packets. As described earlier, a respective data tunnel is associated with a respective uplink of the first network device, and a respective uplink of the second network device. In some implementations, the first network device writes contact point information such as the IP address, port number and/or uplink identifier of the first uplink to the first group of packets, so that the second network device can address reply messages to the first uplink. For example, a communication module of tunnel management module 190 of Device A 151 in FIG. 3, writes contact point information corresponding to an uplink of Device A 151 corresponding to a selected data tunnel for forwarding packets.

As represented by block 822, the first network device forwards one or more packets of the first group of packets to the second network device through the selected first data tunnel. In some implementations, the first network device keeps forwarding packets from the first group of packets through the first data tunnel until it receives feedback from the second network device to use a different data tunnel, or the characteristics of the first data tunnel become incompatible with the one or more packet-forwarding rules. For example, as discussed earlier with respect to FIG. 5B, VoIP packets are preferably sent through a path with less than 2 ms of jitter, therefore if the first data tunnel experiences greater than 2 ms of jitter, the first network device ceases to forward VoIP packets from the first group of packets through the first data tunnel. For example, a communication module of tunnel management module 190 of Device A 151 in FIG. 3, forwards one or more packets of the first group of packets to another network device of network environment 300.

Method 800 includes, as represented by block 824, receiving a first reply message from the second network device, through a second data tunnel. In some implementations, the second data tunnel is the same data tunnel as the first data tunnel. In some implementations, the first reply message includes contact point information of the respective uplink of the second network device, associated with the second data tunnel. For example, with respect to FIG. 2B, Device A 151 selected Tunnel A 210 as the first data tunnel for forwarding video conferencing packets to Device B 154. In this example, Device B 154 has a policy-based rule prohibiting video conferencing traffic from being transferred using its Uplink 0 172, therefore it sends a reply message to Device A 151 through Tunnel C 214, associated with its Uplink 1 173. In this example, Device B 154 read the contact point information corresponding to Uplink 0 170 of Device A 151 from one or more packets received through Tunnel A 210, so it addressed its reply message to Uplink 0 170, and included contact point information corresponding to its own Uplink 1 173. For example, a communication module of tunnel management module 190 of Device A 151 in FIG. 2B, receives the reply message from Device B 154.

As represented by block 826, the method 800 includes determining a first peer uplink identifier of the second network device from the first reply message, where the first peer uplink identifier is associated with the second data tunnel. As described in the previous example, the first peer uplink identifier identifies Uplink 1 173 of Device B 154. For example, a peer uplink identification module of tunnel management module 190 of Device A 151 in FIG. 2B, identifies Uplink 1 173 of Device B 154.

Method 800 includes, as represented by block 828, selecting a third data tunnel from the plurality of data tunnels for forwarding remaining packets from the first group of packets to the second network device. In some implementations, the third data tunnel is the same as one or both of the first data tunnel and the second data tunnel. For example, as described in the previous example with respect to FIG. 2B, Device B 154 sends a reply message through a second data tunnel, Tunnel C 214 associated with its own Uplink 1 173 and Uplink 0 170 of Device A 151. In this example, Device A 151 determines that Tunnel C 214 is unacceptable for forwarding the remaining packets of the first group of packets, because it does not satisfy one or more performance-based rules. Therefore, Device A 151 selects Tunnel D 216, which does satisfy one or more performance-based rules, and is also associated with Uplink 1 173 of Device B 154. In some implementations, method 800 includes forwarding the remaining packets to the second network device through the third data tunnel. For example, a tunnel selection module of tunnel management module 190 of Device A 151 in FIG. 2B, selects Tunnel D 216.

Figure 9:
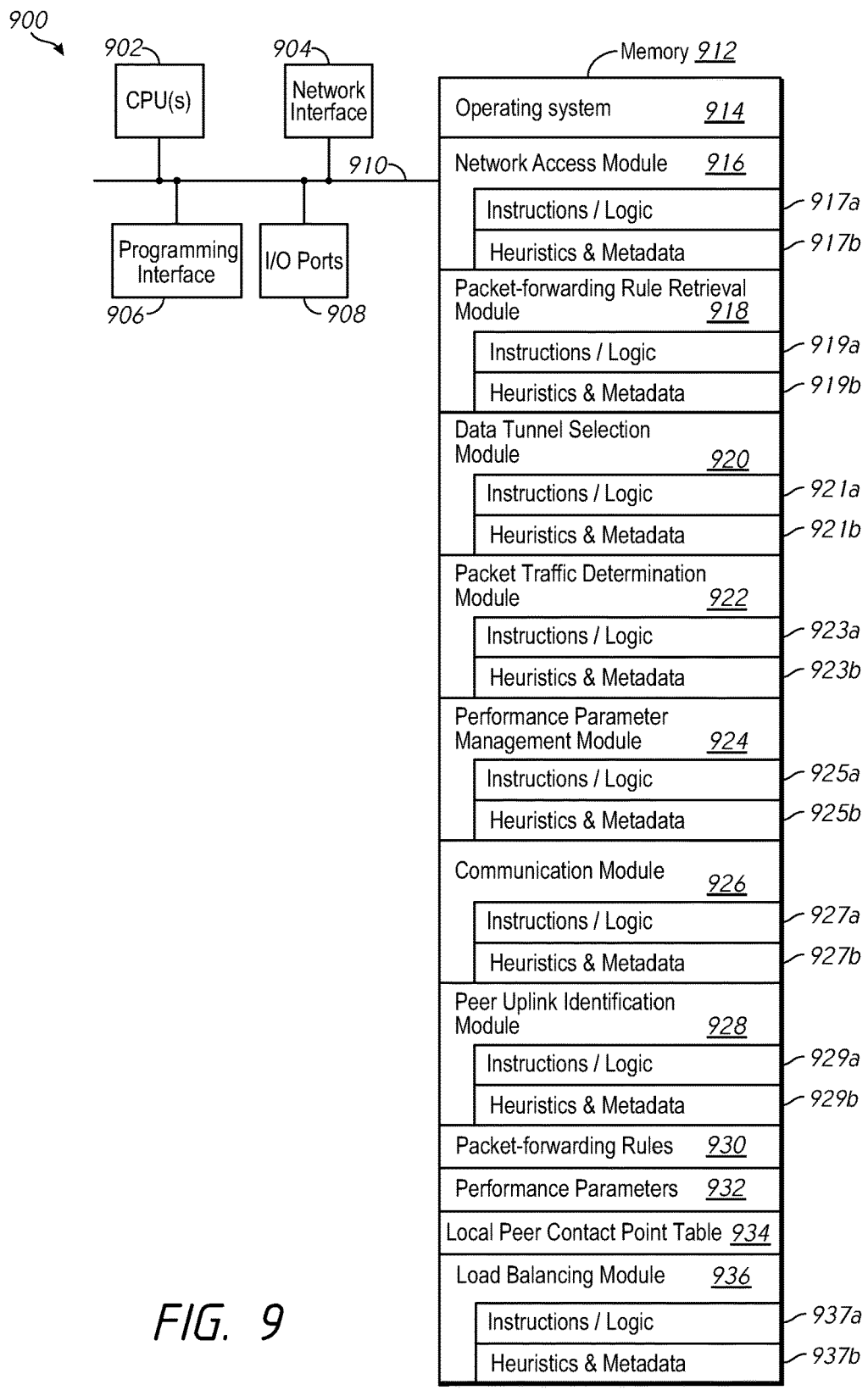
FIG. 9 is a block diagram of an example multi-uplink network device of a networking environment in accordance with some implementations.

FIG. 9 is a block diagram of an example network device 900 of a networking environment in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network device 900 includes one or more processing units (CPU's) 902, a network interface 904, a programming interface 906, one or more I/O ports 908, a memory 912, and one or more communication buses 910 for interconnecting these and various other components.

In some implementations, the communication buses 910 include circuitry that interconnects and controls communications between system components. The memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 912 optionally includes one or more storage devices remotely located from the CPU(s) 902. The memory 912 comprises a non-transitory computer readable storage medium. In some implementations, the memory 912 or the non-transitory computer readable storage medium of the memory 912 stores the following programs, modules and data structures, or a subset thereof including an optional operating system 914, a network access module 916, a packet-forwarding rule retrieval module 918, a data tunnel selection module 920, a packet traffic determination module 922, a performance parameter management module 924, a communication module 926, a peer uplink identification module 928, a set of packet-forwarding rules 930, a set of performance parameters 932, and local peer contact point table 934.

The operating system 914 includes procedures for handling various basic system services and for performing hardware dependent tasks. In some implementations, network access module 916 is configured to allow the network device 900 to transmit and receive communications (e.g., to transmit registry request messages and/or receive response messages). To that end, in various implementations, the network access module 916 includes instructions and/or logic 917a, heuristics and metadata 917b.

In some implementations, packet-forwarding rule retrieval module 918 is configured to retrieve one or more packet-forwarding rules. In some implementations this includes being configured to retrieve one or more packet-forwarding rules from packet-forwarding rules 930. The packet-forwarding rule retrieval module 918 is also configured, in some implementations, to retrieve policy-based rules and/or performance-based rules. To that end, in various implementations, the packet-forwarding rule retrieval module 918 includes instructions and/or logic 919a, heuristics and metadata 919b.

In some implementations, data tunnel selection module 920 is configured to select a data tunnel from a plurality of data tunnels between network device 900 and another network device, for forwarding one or more packets. In some implementations, data tunnel selection module 920 communicates with packet traffic determination module 922 and packet-forwarding rule retrieval module 918 to assist in selecting a data tunnel. To that end, in various implementations, the data tunnel selection module 920 includes instructions and/or logic 921a, heuristics and metadata 921b.

In some implementations, packet traffic determination module 922 is configured to determine one or more network traffic types associated with one or more packets. For example, packet traffic determination module 922 determines that one or more packets received by communication module 926 are of an audio, video, voice-over-IP, web browsing, financial transaction or file transfer traffic type. To that end, in various implementations, the packet traffic determination module 922 includes instructions and/or logic 923a, heuristics and metadata 923b.

In some implementations, performance parameter management module 924 is configured to perform various management operations on the set of performance parameters 932, and to obtain performance parameter values. For example, performance parameter management module 924 stores, updates, retrieves and backs up information in the set of performance parameters 932. In some implementations this includes being configured to obtain one or more performance parameter values preferred by the data tunnel selection module 924 to select a data tunnel. To that end, in various implementations, the performance parameter management module 924 includes instructions and/or logic 925a, heuristics and metadata 925b.

In some implementations, communication module 926 is configured to transmit and receive packets, messages and/or other types of communications. For example, communication module 926 is configured to receive one or more packets for forwarding to a second device, from a client device. In some implementations, the communication module 926 is configured to send and/or receive one or more packets with respect to another network device, and is configured to send and/or receive one or more reply messages with respect to another network device. To that end, in various implementations, the communication module 926 includes instructions and/or logic 927a, heuristics and metadata 927b.

In some implementations, peer uplink identification module 928 is configured to identify a respective peer uplink identifier of another network device. For example, peer uplink identification module 928 is configured to determine a respective peer uplink identifier from a respective reply message, wherein a respective peer uplink identifier identifies a respective peer uplink of a plurality of peer uplinks of another network device, associated with one or more private network data tunnels between network device 900 and the other network device. To that end, in various implementations, the peer uplink identification module 928 includes instructions and/or logic 929a, heuristics and metadata 929b.

In some implementations, the set of packet-forwarding rules 930 stores one or more rules used by network device 900 for selecting a data tunnel out of a plurality of data tunnels between network device 900 and another network device, for forwarding one or more packets. In some implementations, the set of packet-forwarding rules 930 includes one or more policy-based rules, and/or one or more performance-based rules. For example, the set of packet-forwarding rules 930 includes a policy-based rule that requires all VoIP traffic to use a data tunnel associated with an MPLS uplink of network device 900.

In some implementations, the set of performance parameters 932 stores one or more values corresponding to one or more performance parameters for respective data tunnels between network device 900 and its peer network devices. In some implementations, the set of performance parameters 932 includes statistics corresponding to performance characteristics of respective data tunnels. For example, the set of performance parameters 932 includes a value for the jitter associated with a first data tunnel between network device 900 and another network device.

In some implementations, local peer contact point table 934 stores contact point information for one or more peer network devices of network device 900, such as network devices with a direct communication path or data tunnel to network device 900. In some implementations, local peer contact point table 934 also stores the contact point information corresponding to one or more uplinks of network device 900. In some implementations, local peer contact point table 934 stores additional information pertaining to network device 900 and/or one or more of its peer devices, such as online status, hub/spoke/mesh topology configuration and corresponding LAN information.

In some implementations, load-balancing module 936 is configured to perform load balancing of network traffic over one or more data tunnels between network device 900 and a peer network device of network device 900. To that end, in various implementations, the load-balancing module 936 includes instructions and/or logic 937a, heuristics and metadata 937b.

While various aspects of implementations within the scope of the appended claims are described above, those of ordinary skill in the art will appreciate from the present disclosure that in some embodiments, the various features of implementations described above are embodied in a wide variety of forms and that any specific structure and/or function described above is merely illustrative. Based on the present disclosure one skilled in the art will appreciate that in some embodiments, an aspect described herein is implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, those of ordinary skill in the art will appreciate from the present disclosure that these elements will not be limited by these terms. These terms are used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
   at a first network device, including a memory, a non-transitory computer readable storage medium, one or more processors and two or more communication ports:
   receiving a first group of packets for forwarding to a second network device;
   obtaining packet-forwarding rules for forwarding the first group of packets;
   selecting a first private network data tunnel from a plurality of private network data tunnels established between the first network device and the second network device, for forwarding a first packet of the first group of packets, wherein the first private network data tunnel satisfies the packet-forwarding rules, wherein each private network data tunnel of the plurality is associated with an active uplink of the first network device;
   forwarding the first packet to the second network device through the first private network data tunnel;
   receiving a first reply message from the second network device, through a second private network data tunnel of the plurality of private network data tunnels;
   selecting a third private network data tunnel from the plurality of private network data tunnels for forwarding remaining packets of the first group of packets to the second network device; and
   forwarding the remaining packets of the first group of packets to the second network device through the third private network data tunnel.

2. The method of claim 1, further comprising:
   determining a type of traffic associated with the first group of packets; and
   obtaining packet-forwarding rules for forwarding the first group of packets, based in part on the type of traffic.

3. The method of claim 1, wherein the plurality of private network data tunnels are simultaneously maintained between the first network device and the second network device, and wherein a type of traffic associated with the first group of packets includes one or more of audio, video, voice-over-IP, web browsing, financial transaction or file transfer traffic.

4. The method of claim 1, further comprising:
   retrieving performance parameter values for each private network data tunnel of the plurality of private network data tunnels, in accordance with a determination that the packet-forwarding rules include one or more performance-based rules.

5. The method of claim 1, wherein the packet-forwarding rules include one or more policy-based rules.

6. The method of claim 1, wherein forwarding the first packet to the second network device includes encapsulating the first packet with a first wrapper, wherein the first wrapper includes contact point information corresponding to the first uplink corresponding to the first private network data tunnel.

7. The method of claim 1, further comprising:
determining a first peer uplink identifier from the first reply message, wherein the first peer uplink identifier identifies a first peer uplink of a plurality of peer uplinks of the second network device, associated with the second private network data tunnel.

8. The method of claim 7, wherein selecting the third private network data tunnel is based in part on the identified first peer uplink of the second network device associated with the second private network data tunnel.

9. The method of claim 7, wherein the third private network data tunnel is associated with the first uplink of the first network device and the first peer uplink of the second network device.

10. The method of claim 1, further comprising:
sending one or more performance packets to the second network device through a respective data tunnel of the plurality of data tunnels;
receiving one or more performance-feedback packets from the second network device through the respective data tunnel;
assessing one or more performance parameters for the respective data tunnel; and
updating performance parameter values for the respective data tunnel, based on the one or more performance parameters assessed.

11. The method of claim 1, wherein selection of the first private network data tunnel is based in part on historical selection data.

12. A first network device comprising:
two or more communication ports;
one or more processors;
a non-transitory computer readable storage medium storing instructions that, when executed by the one or more processors, cause the first network device to:
receive a first group of packets for forwarding to a second network device;
retrieve packet-forwarding rules for forwarding the first group of packets; and
select a first private network data tunnel from a plurality of private network data tunnels established between the first network device and the second network device, for forwarding a first packet of the first group of packets, wherein the first private network data tunnel satisfies the packet-forwarding rules, wherein each private network data tunnel of the plurality is associated with an active uplink of the first network device;
forwarding the first packet to the second network device through the first private network data tunnel;
receiving a first reply message from the second network device, through a second private network data tunnel of the plurality of private network data tunnels;
selecting a third private network data tunnel from the plurality of private network data tunnels for forwarding remaining packets of the first group of packets to the second network device; and
forwarding the remaining packets of the first group of packets to the second network device through the third private network data tunnel.

13. The first network device of claim 12, wherein the instructions further cause the first network device to determine a type of traffic associated with the first group of packets, and to retrieve packet-forwarding rules for forwarding the first group of packets, based in part on the type of traffic.

14. The first network device of claim 12,
wherein the instructions further cause the first network device to retrieve performance parameter values for each private network data tunnel of the plurality of private network data tunnels, in accordance with a determination that the packet-forwarding rules include one or more performance-based rules.

15. The first network device of claim 12, wherein the instructions further cause the first network device to select the first private network data tunnel partially on a basis of historical selection data.

16. The first network device of claim 12, wherein the packet-forwarding rules include one or more policy-based rules.

17. The first network device of claim 12, wherein a type of traffic associated with the first group of packets includes one or more of audio, video, voice-over-IP, web browsing, financial transaction or file transfer traffic.

18. A
non-transitory computer readable medium storing instructions that, when executed by the a processors cause a system to perform operations comprising:
receive a first group of packets for forwarding to a second network device;
retrieve packet-forwarding rules for forwarding the first group of packets; and
select, by the first network device, a first private network data tunnel from a plurality of private network data tunnels simultaneously maintained between the first network device and the second network device, for forwarding a first packet of the first group of packets, wherein the first private network data tunnel satisfies the packet-forwarding rules, wherein the first private network data tunnel is associated with a first uplink of the first network device;
forward the first packet to the second network device through the first private network data tunnel;
receive a first reply message from the second network device, through a second private network data tunnel of the plurality of private network data tunnels;
select a third private network data tunnel from the plurality of private network data tunnels for forwarding remaining packets of the first group of packets to the second network device; and
forward the remaining packets of the first group of packets to the second network device through the third private network data tunnel.

19. The media of claim 18, wherein each private network data tunnel of the plurality is associated with an active uplink of the first network device, and the instructions further cause the system to determine a type of traffic associated with the first group of packets and to retrieve packet-forwarding rules for forwarding the first group of packets, based in part on the type of traffic.

* * * * *